Patented Apr. 27, 1948

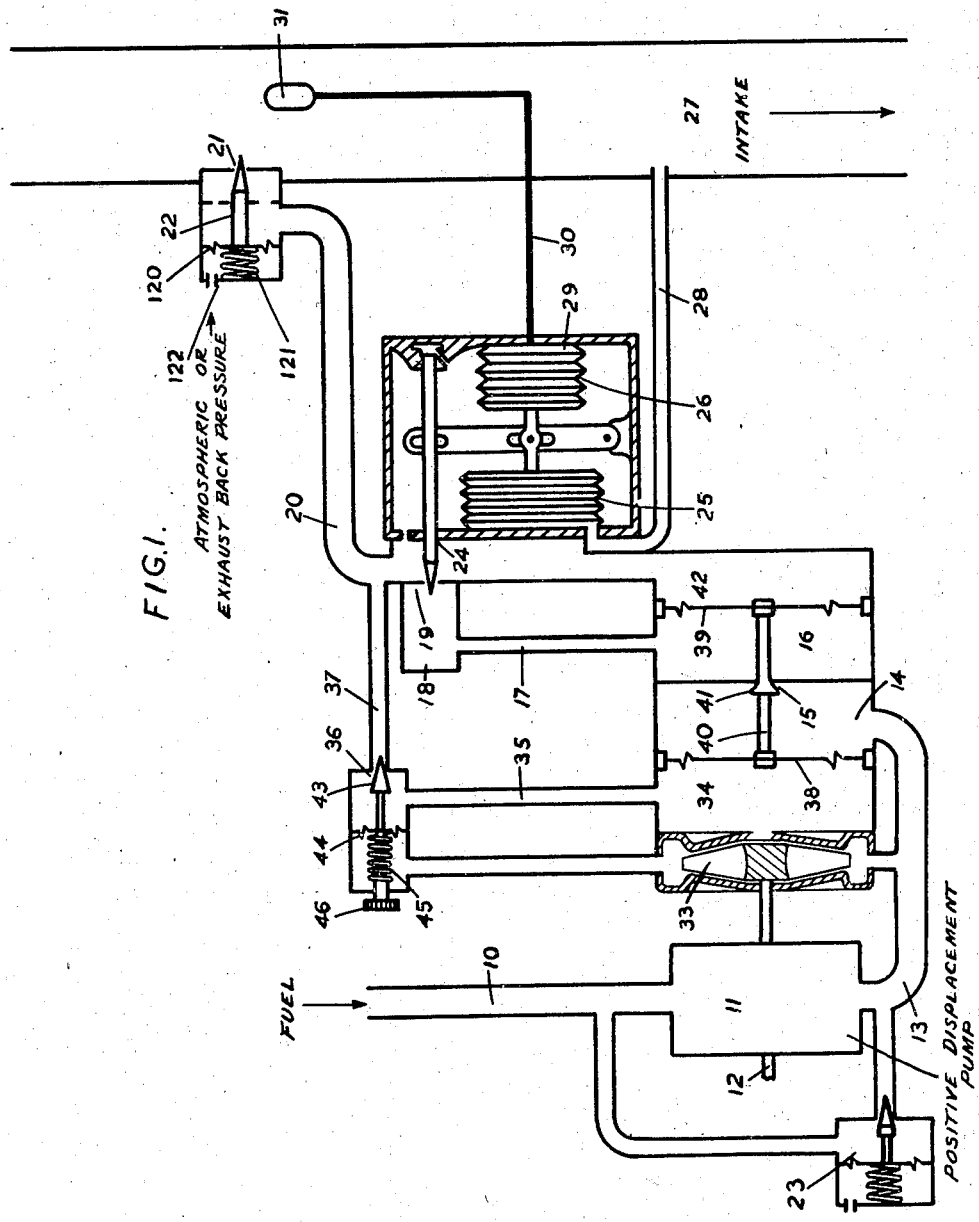

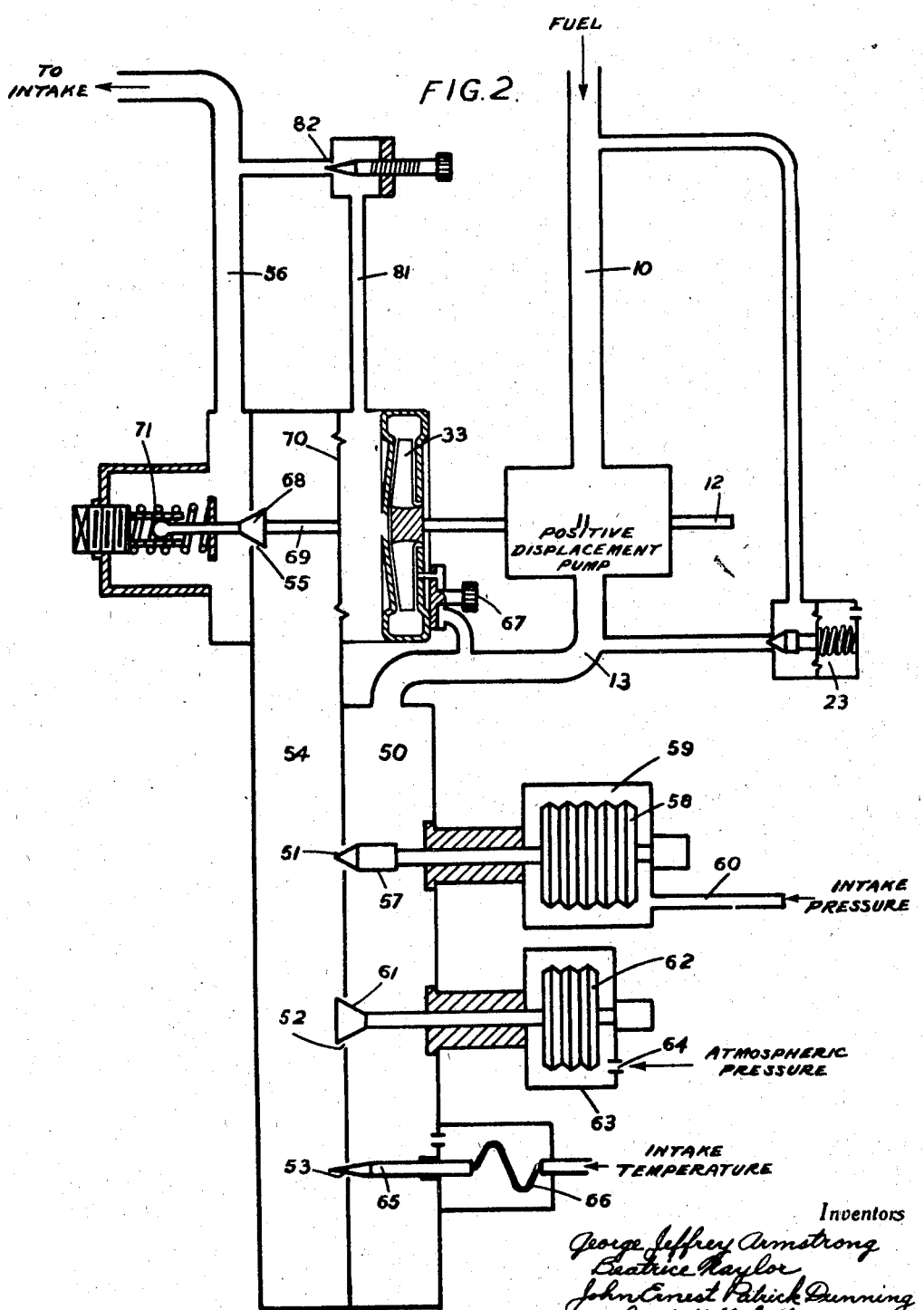

2,440,567

UNITED STATES PATENT OFFICE 2,440,567

FUEL SUPPLY SYSTEM FOR INTERNAL-COMBUSTION ENGINES

George Jeffrey Armstrong, Beatrice Naylor, and John Ernest Patrick Dunning, Farnborough, England Application February 27, 1945, Serial No. 580,030
In Great Britain June 9, 1943

6 Claims. (Cl. 123—119)

The invention relates to a fuel supply system for a reciprocating internal combustion engine in which fuel after passage through an adjustable metering valve or valves is injected into an intake along which air passes to the engine.

It is known that the mass air consumption of the engine, i. e. the air consumption measured in units of mass per unit time, and hence the fuel requirements are dependent on the absolute pressure in the intake manifold, the absolute exhaust back pressure, the temperature in the intake manifold, and the rotational speed of the engine crankshaft. In most engines the exhaust back pressure is nearly the same as and varies with atmospheric pressure, and in controlling the fuel supply the value of the atmospheric pressure may be measured instead of measuring exhaust back pressure directly.

The invention is more particularly concerned with the regulation of the pressure difference across the metering valve or valves so as to provide for a given adjustment of the valve or valves the desired relationship (usually approximately linear) between engine speed and fuel flow, and is a further development of the invention of U. S. application Serial No. 522,352.

In accordance with the invention a fuel supply system as hereinbefore specified comprises an adjustable pressure regulating valve for regulating the pressure difference across an adjustable metering valve, an element for adjusting the pressure regulating valve in response to changes in the pressure difference generated by an engine driven centrifugal pump through which fuel is passed from an inlet at or near the periphery to an outlet at or near the eye and thence direct to the intake manifold.

The forward flow from the outlet of the centrifugal pump to the intake manifold gives certain advantages in the present system as compared with any system specifically described in the specification of the aforesaid copending U. S. application. Thus for example dissolved air separating in the centrifugal pump is not re-circulated through the system but is removed at once. Furthermore, the passage between the outlet from the centrifugal pump and the intake manifold may be provided with an adjustable valve and may thus be caused to constitute a convenient form of slow running device.

Other features of the invention will become apparent from the detailed description read in conjunction with the accompanying drawings in which Figs. 1 and 2 are schematic sectional views of alternative systems embodying the invention.

Referring to Fig. 1 fuel entering through passage 10 passes into a positive displacement pump 11 which is driven from the engine through shaft 12 and which it leaves through passage 13 and passes to the engine through chamber 14, pressure regulating valve 15, chamber 16, passage 17, chamber 18, metering valve 19, passage 20 and discharge nozzle 21. The discharge nozzle 21 is adjustable by means of a tapered needle 22 in the manner described in copending British application No. 9250/43 (U. S. Serial No. 580,028), the needle 22 being for this purpose secured to a diaphragm 120 which is backed by a spring 121 in a chamber having a port 122 open to the atmosphere. The right hand side of the diaphragm 120 is therefore acted on by the pressure of the fuel in the passage 20 while the left hand side is acted on by atmospheric pressure and by the pressure applied by the spring 121. The needle 22 is therefore adjusted automatically to maintain the pressure of the fuel in the passage 20 at a value exceeding atmospheric pressure by a quantity dependent on the stiffness of the spring 121. If the design of the exhaust system or the presence of exhaust-driven accessories, such as an exhaust-driven turbo supercharger, renders it no longer possible to assume that the exhaust back pressure is always approximately equal to atmospheric pressure, it may be necessary to measure the exhaust back pressure directly instead of indirectly through the atmospheric pressure, in which case the port 122 may be connected to the engine exhaust, as indicated by the legend in Fig. 1, so that the pressure of the fuel in the passage 20 is maintained at a value exceeding the exhaust back pressure by an amount determined by the pressure exerted by the spring 121. The output of the positive displacement pump 11 is arranged to exceed the maximum fuel requirements of the engine at any operating speed and to dispose of the excess output a relief valve 23 is provided. The effective area of the metering valve 19 is adjusted by a tapered needle 24 whose position is controlled by an assembly of flexible bellows 25, 26. The bellows 25 is subjected internally to the pressure in the intake manifold 27 through a pipe 28; the bellows 26 is evacuated and anchored to a temperature responsive capsule 29 which is connected by the tube 30 to a thermometer bulb 31 situated in the intake manifold and which consequently responds to changes of temperature in the intake manifold. The operation of the needle 24 and the control assembly also forms part of the specification of co-pending British application No. 9250/43 (U. S. Serial No. 580,028).

Driven by the same shaft 12 as the positive displacement pump 11 is a centrifugal pump 33 in which the pressure at its periphery is the same as the pressure in the passage 13, which is regulated to a pre-determined value by the relief valve 23, and which generates a pressure difference such that the pressure at the eye is always less than the pressure at the periphery and in the passage 13. Because it is so arranged that the pressure drop between the passages 13 and 20 is at all times greater than the pressure difference developed by the centrifugal pump 33, liquid passes through the centrifugal pump from the periphery towards the eye where an outlet into a chamber 34 is provided, liquid from the chamber 34 passing therefrom to passage 35, valve 36, passage 37 and through passage 20 and discharge nozzle 21 into the intake manifold. Dividing the chamber 34 from the chamber 14 is a flexible diaphragm 38 to which is attached a second diaphragm 39 by a rod 40 carrying a tapered plug 41, movement of which adjusts the effective area of the pressure regulating valve 15. The diaphragm 39 is subject on the one side to the pressure in chamber 16 and on the other side to the pressure in a chamber 42 connected to pipe 20. Consequently, the effective area of the pressure regulating valve 15 will be adjusted by movement of the tapered plug until equilibrium is set up between the pressure differences acting in opposition across the two diaphragms 38, 39 which will be set up when the pressure difference across the metering valve 19 is equal to the pressure difference generated by the centrifugal pump 33. By varying the relative areas of the diaphragms 38, 39, the proportionality between these pressure differences may be varied as desired. The pressure difference across the metering valve 19 will consequently be maintained proportional to the square of the speed of the centrifugal pump, i. e. the square of the engine speed, and the flow through the metering valve 19 will therefore, for a given adjustment of the metering valve, be proportional to the engine speed.

The valve 36 forming the slow running device comprises a tapered plug 43 secured to a flexible diaphragm 44. The right hand side of the diaphragm 44 is acted upon by the pressure existing at the eye of the centrifugal pump, while the left hand side is acted upon by the pressure at the periphery of the centrifugal pump. Secured to the left hand side of the diaphragm 44 is a tension spring 45 whose anchorage is adjustable by a knurled nut 46. Consequently the tension spring tends to hold the plug 43 away from its seating, to open the valve 36 while as the engine speed rises the plug 43 is pressed towards its seating. The plug 43 is arranged to allow leakage when pressed on its seating so that a small flow through the valve 36 takes place under all operating conditions, thus maintaining a slow flow through the centrifugal pump 33.

Referring now to Fig. 2 an engine driven positive displacement pump 11 and centrifugal pump 33 are driven and connected as in Fig. 1 and a relief valve 23 is provided as in Fig. 1 to maintain the pressure at the output side of the positive displacement pump 11 at a constant value.

The output of the positive displacement pump 11 is fed through the passage 13 to a chamber 50 which it leaves through metering valves 51, 52, 53, entering chamber 54 which it leaves through pressure regulating valve 55 whence it is supplied through passage 56 to a discharge nozzle not shown but similar to the discharge nozzle 21 shown in Fig. 1. The effective area of the metering valve 51 is controlled by tapered needle 57 attached to an evacuated resilient bellows 58 enclosed in a casing 59 to which the intake manifold is connected by a pipe 60, and the metering valve 52 is controlled by a tapered plug 61 which is connected to an evacuated bellows 62 enclosed in a casing 63 which is vented to the atmosphere at 64. The third metering valve 53 is adjusted by a tapered needle 65 which is attached to a temperature sensitive element 66 to which is connected a thermometer bulb (not shown) located in the intake manifold.

The centrifugal pump 33 is one of which the effective radius at which the pressure used for fuel metering is picked up may be varied at will as described in co-pending U. S. application Serial No. 522,352, now Patent No. 2,407,139, the pump having for this purpose an outlet which is pivoted eccentrically to the pump casing, and which is rotated by a knurled knob 67. The pressure regulating valve 55 is adjusted by a tapered plug 68 connected to a link 69 to one end of which is attached a diaphragm 70. The right hand side of diaphragm 70 is acted upon by the pressure at the eye of the centrifugal pump 33.

An equilibrium adjustment of the pressure regulating valve 55 is established when the pressure on the two sides of the diaphragm 70 balance one another, i. e., when the pressure difference across the metering valves 51, 52, 53 is equal to the pressure difference generated by the centrifugal pump 33. To offset the inherent out-of-balance of the type of tapering plug 68 shown, a spring 71 abuts against a shoulder on the rod 69.

A passage 81 feeds forward from the eye of the centrifugal pump to the passage 56 through an adjustable slow running jet, indicated at 82.

Though for simplicity no supercharger has been shown in the drawings the invention may be embodied in a fuel system for a supercharged engine.

We claim:

1. A fuel supply system for injecting fuel into an intake of an internal combustion engine, comprising a duct entering the intake, an adjustable metering valve located in said duct, an adjustable pressure regulating valve also located in said duct for regulating the pressure difference across said metering valve, a positive displacement pump for supplying fuel to said duct, a centrifugal pump through which fuel is passed by said positive displacement pump from an inlet remote from the eye thereof to an outlet nearer the eye and thence to said intake, a pressure-responsive member arranged to be acted upon by the pressure difference across said centrifugal pump and a connection between said pressure-responsive member and said pressure regulating valve.

2. A fuel supply system for injecting fuel into an intake of an internal combustion engine, comprising a duct entering the intake, an adjustable metering valve located in said duct, an adjustable pressure regulating valve also located in said duct for regulating the pressure difference across said metering valve, a positive displacement pump for supplying fuel to said duct, a centrifugal pump through which fuel is passed by said positive displacement pump from an inlet remote from the eye thereof to an outlet nearer the eye and thence to said intake, a pressure-responsive member acted upon by the pressure difference across said centrifugal pump, a second pressure-responsive member acted upon by the pressure difference across said metering valve, and a connection between said pressure-responsive members and said pressure-regulating valve, whereby said regulating valve is adjusted continuously to maintain the pressure difference across said metering valve proportional to the pressure difference across said centrifugal pump.

3. A fuel supply system for injecting fuel into an intake of an internal combustion engine comprising a positive displacement pump, a duct for conveying fuel from said positive displacement pump to the intake, a centrifugal pump through which fuel is passed by said positive displacement pump from an inlet near the periphery thereof to an outlet near the eye thereof and passes thence to the intake, a metering valve in the duct, so located that the inlet to said valve and said centrifugal pump are fed with fuel at the same pressure, a pressure regulating valve in the duct down stream of the metering valve and a pressure-responsive member connected to the pressure regulating valve to effect adjustment of the same, one side of said pressure-responsive member being acted upon by the pressure existing at the outlet of the centrifugal pump upstream of the metering valve and the other side of said pressure-responsive member being acted upon by the pressure existing downstream of the metering valve, whereby the pressure across said metering valve is maintained the same as the pressure across the centrifugal pump.

4. A fuel supply system as claimed in claim 1, in which the metering valve comprises at least one adjustable element actuated by a member responsive to changes in the absolute pressure and temperature in the intake and in a pressure equivalent to the exhaust back pressure.

5. A fuel supply system as claimed in claim 1, in which an adjustable slow running valve is interposed between the centrifugal pump and the intake.

6. A system for injecting fuel into the intake of an internal combustion engine, comprising a positive displacement pump for supplying fuel to the intake, at least one adjustable metering valve whose total flow area is adjusted in response to changes in the absolute pressure and temperature in the intake and a pressure equivalent to the exhaust back pressure, a centrifugal pump located to be fed with fuel from said positive displacement pump from an inlet at the high pressure side thereof to an outlet at the low pressure side thereof and thence to the intake, and pressure-regulating means for regulating the pressure drop across said metering valve to maintain the same proportional to the pressure drop across the centrifugal pump.

GEORGE JEFFREY ARMSTRONG.
BEATRICE NAYLOR.
JOHN ERNEST PATRICK DUNNING.

REFERENCES CITED

The following references are of record in the file of this patent:

UNITED STATES PATENTS

| Number | Name | Date |
|---|---|---|
| 2,224,472 | Chandler | Dec. 10, 1940 |
| 2,250,932 | Kittler | July 29, 1941 |
| 2,303,998 | Holly, Jr. | Dec. 1, 1942 |
| 2,341,257 | Wunsch | Feb. 8, 1944 |
| 2,348,008 | Hunt | May 2, 1944 |
| 2,374,844 | Stokes | May 1, 1945 |

FOREIGN PATENTS

| Number | Country | Date |
|---|---|---|
| 429,682 | Great Britain | June 4, 1935 |
| 523,895 | Great Britain | July 25, 1940 |